US006259013B1

(12) United States Patent
Walsh

(10) Patent No.: US 6,259,013 B1
(45) Date of Patent: Jul. 10, 2001

(54) MUSICAL NOTE READING METHOD AND WRITTEN EXERCISES

(75) Inventor: Kelly Ann Walsh, Teqvesta, FL (US)

(73) Assignee: Kelly A Walsh, Tequesta, FL (US)

( * ) Notice: Subject to any disclaimer, the term of this patent is extended or adjusted under 35 U.S.C. 154(b) by 0 days.

(21) Appl. No.: 09/653,871

(22) Filed: Sep. 1, 2000

(51) Int. Cl.[7] .................................................. G04B 15/02
(52) U.S. Cl. ..................... 84/483.2; 84/483.1; 84/470 R; 434/167; 434/430; 434/159
(58) Field of Search ............................... 84/483.2, 483.1, 84/470 R; 434/159, 167, 171, 172, 430

(56) References Cited

U.S. PATENT DOCUMENTS

| 682,015 | * | 9/1901 | Adams | 84/483.2 |
| 5,496,179 | * | 3/1996 | Hoffman | 434/433 |

FOREIGN PATENT DOCUMENTS

6654 * 1/1904 (GB) .

OTHER PUBLICATIONS

Computed–Assistal Instruction in Treble Clef Notes Reading for Gifted, Primary Students. Nova Univ., Jan. 1988.*

* cited by examiner

*Primary Examiner*—Shih-Yung Hsieh

(57) ABSTRACT

A method that facilitates the learning process of musical note reading which is exhibited in a series of written exercises. Musical notes and letters of the alphabet are arranged in a specific order on musical staffs that consist of five horizontal lines. Each staff begins with a musical clef and is often, but not always, separated into segments by vertical lines. When each note is correctly identified and translated into the appropriate letter of the musical alphabet, either a, b, c, d, e, f, or g, the answers, in combination with the letters printed, will form recognizable words.

1 Claim, 3 Drawing Sheets

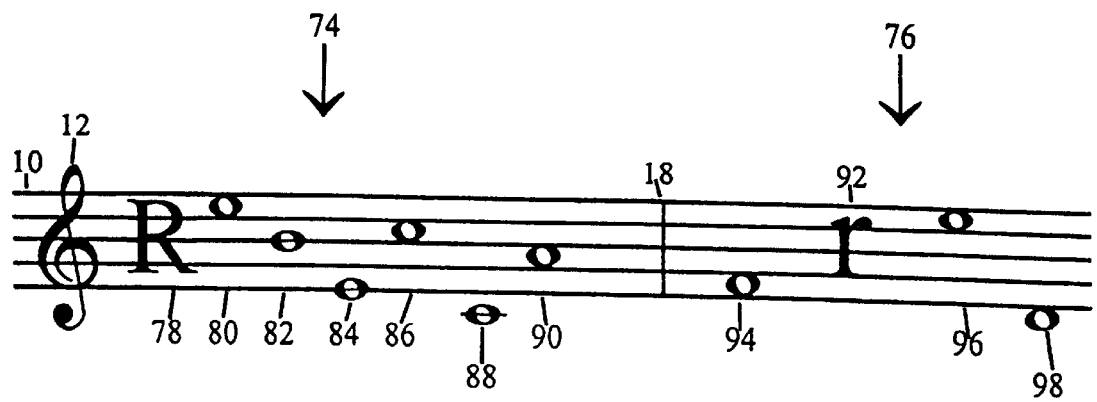

MUSICAL NOTE READING METHOD AND WRITTEN EXERCISES

BACKGROUND—FIELD OF INVENTION

The present invention relates to music education, particularly a method that facilitates the learning process of musical note reading.

BACKGROUND OF THE INVENTION

Virtually every publisher of musical material offers some kind of note recognition work-book (none patented). These books usually have the same format; individual notes are printed with an answer line underneath each note. The student determines the letter names of the notes, either a, b, c, d, e, f, or g, and writes his answers on the lines provided. The notes usually have no correlation to each other, and are chosen and printed at random. This method often fails the student because of its tiresome, didactic approach.

Other work-books employ the same style (notes with answer lines underneath), but in attempt to create student interest, the notes are printed in a specific order. If the student correctly identifies the letter names of the notes, the answers will spell words such as "ace" or "beg". This format, also, often fails the student when he tires of forming arbitrary words. Furthermore, because there are few words that can be formed from the musical alphabet, a through g, the answers form the same words, repetitiously, throughout the book. Eventually, the average student can accurately guess the answers after deciphering only a few of the notes' letter names.

OBJECTS AND ADVANTAGES

The method presented here offers several features that make it a more effective format for learning than other methods previously written. It eliminates repetition of answer words by including all letters of the alphabet in the exercises. For example, one exercise may include a t, s, or k; these are letters that are not in the musical alphabet, but when combined with the letters a through g, a great variety of words can be formed.

The present method is a great improvement over those previously written because it offers the opportunity for the student to self-correct his own work. The exercises are separated into groups. In each group, the answer words pertain to the same topic. Because the student knows that each group of exercises has the same topic, he will know if he has incorrectly identified a note's letter name because the word that was formed by his answers and the letters given will not be recognizable, nor will it relate to the topic of the group. For example, if a student is working on a group of exercises titled "Animals", and the word he forms spells b-a-d-g-e-r, he will know that he has correctly identified each note because a badger is an animal. This is a great advantage over other methods because the student can identify and correct his mistakes immediately. Because other methods do not group exercises into common topics, they require a music teacher, or a person familiar with music reading to correct mistakes. If a teacher is not readily available, the student may assimilate the incorrect answers. Therefore, it is an object of the present invention to provide a musical note reading method that helps music students identify the letter names of musical notes quickly and accurately.

It is an additional object of the present invention to provide a musical note reading method that includes repetition, without redundancy, as a learning device. Most previously written exercises are pedantic. Notes are printed at random with an answer line underneath each note for the student to write his answer. others rely on the answers to the musical notes, only, to spell arbitrary words. The resulting answer words can only be made from the letters a, b, c, d, e, f, or g. Because there are few words that can be formed from these five consonants and two vowels, the average student can usually guess the answers, if he doesn't tire of the exercises and abandon them, first. The present method includes repetition, without redundancy, in its exercises. Although the answer words are rarely repeated, the same notes recur continually throughout the exercises. The student is usually unaware of this repetition because his attention is diverted to the enjoyable process of word formation. The student will identify the letter names of the notes progressively faster as he progresses through the exercises.

It is still a further object of the present invention to provide a musical note reading method that will motivate the student to progress. A student of any subject will learn faster and with less effort if he enjoys the material. This method was designed to be an entertaining approach to learning musical note reading. This is accomplished, in part, through educational games such as word search, drawing pictures, and word games. These exercises, unlike those previously written, are not pedantic. Therefore, the student is mostly unaware of the effort associated with learning how to read music. Further objects and advantages of my invention will become apparent from a consideration of the drawings and ensuing description.

BRIEF DESCRIPTION OF THE DRAWINGS

FIG. 3 shows two exercises from the "See if Your Name is Here" work-sheet.

DETAILED DESCRIPTION OF THE DRAWINGS

While certain examples of the invention are shown here, this patent is not limited to these specific arrangements.

Figure 1:
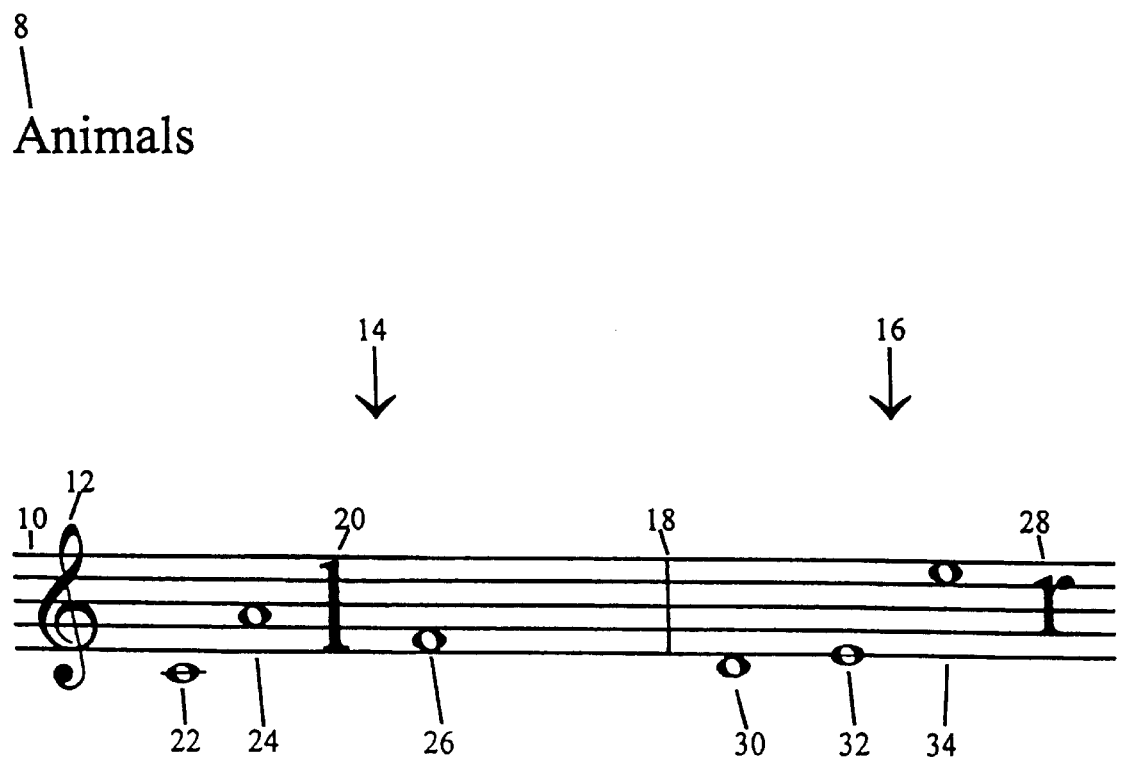
FIG. 1 shows two exercises from the "Animals" work-sheet.

In reference to FIG. 1, two exercises from the work-sheet "Animals" are shown. The title 8 of the work-sheet is printed above the exercises. The staff 10, five horizontal lines, begins with a treble clef 12 (a standard musical symbol) and is separated into two parts, or measures 14,16 by a vertical line 18. In the first measure 14, a letter l 20 is printed along with three musical notes 22,24,26. In the second measure 16, a letter r 28 is printed along with three musical notes 30,32,34.

Figure 2:
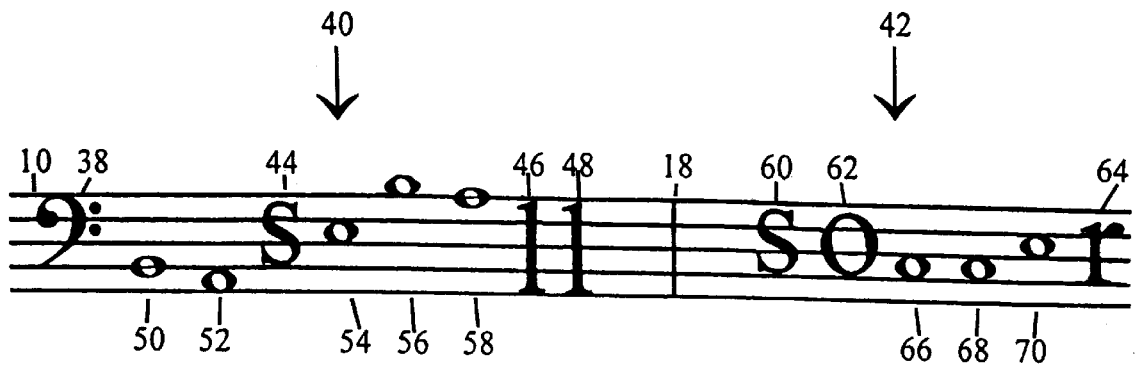
FIG. 2 shows two exercises from the "Circle Which One You Like Better" work-sheet.

In reference to FIG. 2, two exercises from the work-sheet "Circle Which One You Like Better" are shown. The title 36 is printed above the exercises. The staff 10 begins with a bass clef 38 (a standard musical symbol) and is separated into two measures 40,42 by a vertical line 18. In the first measure 40, the letters s 44, l 46, and l 48 are printed along with five musical notes 50,52,54,56,58. In the second measure 42, the letters s 60, o 62, and r 64 are printed along with three musical notes 66,68,70.

In reference to FIG. 3, two exercises from the work-sheet "See if Your Name is Here" are shown. The title 72 is printed above the exercises. The staff 10 begins with a treble clef 12 and is separated into two measures 74,76 by a vertical line 18. In the first measure 74, a letter r 78 is followed by six musical notes 80,82,84,86,88,90. In the second measure 76, a letter r 92 is printed along with three musical notes 94,96,98.

OPERATION OF THE INVENTION

In FIG. 1, two exercises from the work-sheet "Animals" are shown. After reading the title 8, the student will know that in the exercises that follow, his answers should relate in some way to animals. The five horizontal lines on which the notes are placed, called a staff 10, has a treble clef 12 at the beginning. This clef 12 is a standard musical symbol and should be recognizable to a music student. The staff 10 is separated into two parts, or measures 14, 16 by a vertical line 18. Each measure 14,16 is a separate exercise. Although the staff 10 is separated into two measures 14,16 in this exercise, other exercises not shown, but included in this patent, are not limited to two measures per staff, or may not be divided at all.

In the first measure 14, a letter l 20 is printed along with three musical notes 22,24,26. The student should identify the first note 22 as c. He will write a letter c near the first note 22. The student should then determine that the second note 24 is an a, and proceed to write a letter a near the second note 24. The last note 26 in the measure 14 should be identified as an f. When the first measure 14 is correctly completed, the printed letter l 20 will be preceded by the student's answers c and a, and followed by his answer, f. Thereby, the word "calf" is formed. Because a calf is an animal, the title 8 of these exercises, the student will know that his answers, c, a, and f are correct.

The student should then proceed to the second measure 16, where the letter r 28 is printed along with three musical notes 30,32,34. The correct names of the three notes 30,32, 34 are d, e, and e. When combined with the letter r 28 printed at the end of the measure 16, the word "deer" will be formed. Because a deer is an animal, the title 8 of these exercises, the student will know if he has correctly identified the three notes 30,32,34.

In reference to FIG. 2, two exercises from the work-sheet "Circle Which One You Like Better" are shown. The staff 10, five horizontal lines, has a bass clef 38 at the beginning. This clef 38 is a standard musical symbol and should be recognizable to a music student. The staff 10 is separated into two measures 40,42 by a vertical line 18. In the first measure 40, the letters s 44, l 46, and l 48 are printed along with five musical notes 50,52,54,56,58. The student should determine that the letter names of these five notes 50,52,54, 56,58 are b, a, e, b, and a, and will write his answers near each one. When this measure 40 is correctly completed, the printed letter s 44 will be preceded by the student's answers b and a, and followed by his answers e, b, and a. When combined with the printed letters s 44, l 46, and l 48, the student's answers b, a, e, b, and a will form the word "baseball".

The student will then proceed to the second measure 42 where the letters s 60, o 62, and r 64 are printed along with three musical notes 66,68,70. The student should identify the letter names of the three notes 66,68,70 as c, c, and e. His answers, combined with the printed letters s 60, o 62, and r 64, will form the word "soccer" if correct. If these exercises are correctly completed, the two measures 40,42 will read "baseball/soccer". The student will then decide which sport he prefers and will circle the appropriate word. He will then proceed to write his answers for the remainder of the work-sheet (not shown) while circling his preferences.

In reference to FIG. 3, two exercises from the "See if Your Name is Here" work-sheet are shown. After reading the title 72, the student will know that his answers should spell names. The staff 10 has a treble clef 12 at the beginning and is separated into two measures 74,76 by a vertical line 18. In the first measure 74, a letter r 78 is followed by six musical notes 80,82,84,86, 88,90. The student should identify the letter names of these six notes 80, 82,84,86,88,90 as e, b, e, c, c, and a. These answers, combined with the printed letter r 78 will form the name "Rebecca" if correct.

In the second measure 76, a letter r 92 is printed along with three musical notes 94,96,98. The student should identify the letter names of these notes 94,96,98 as f, e, and d. These answers, combined with the printed r 92, form the name "Fred". The student will then continue through the remainder of the "See if Your Name is Here" work-sheet (not shown) searching for his name.

Although this invention has been described in these three examples, it will be readily apparent to those skilled in this art that various modifications, rearrangements, and substitutions can be made without departing from the spirit of this invention. Because this method could be applied in numerous variations on the exercises shown, I do not wish to be bound by these three samples of my method.

SUMMARY, RAMIFICATIONS, AND SCOPE

Accordingly, the reader will see that this invention provides a musical note reading method that helps music students identify the letter names of musical notes quickly and accurately, by offering repetition without redundancy, by offering the student the opportunity to self-correct his work, and by offering a motivating, entertaining way of learning.

Although the description above contains many specifics, these should not be construed as limiting the scope of the invention, but as merely providing an illustration of some of the presently preferred embodiments of the invention. For example, there could be many exercises under one title, answer words could be repeated under one title or repeated under separate titles, the titles could be eliminated, the staffs, clefs, notes, letters of the alphabet, or titles could be made smaller or larger, the staffs could be divided into many measures or not divided at all, illustrations or color could be added, answer lines could be added near the notes, the notes could be changed from whole notes (as shown) to quarter, half, eighth, or sixteenth notes, the letters printed within the staff could be moved above or below the staff or to an answer line, or the exercises could be shown on a computer screen, rather than on paper.

I claim:

1. A method of written exercise to facilitate the learning process of music reading, comprising the steps of:

providing a plurality of musical staffs, musical notes, and letters of the alphabet; and arranging said musical notes and said letters of the alphabet on said musical staffs in an order that will cause a student's answers to create a word when said musical notes are correctly translated into the letters a, b, c, d, e, f, g.

* * * * *